L. R. ZIFFERER.
EXPANSION BOLT.
APPLICATION FILED DEC. 26, 1912.
1,080,615.
Patented Dec. 9, 1913.
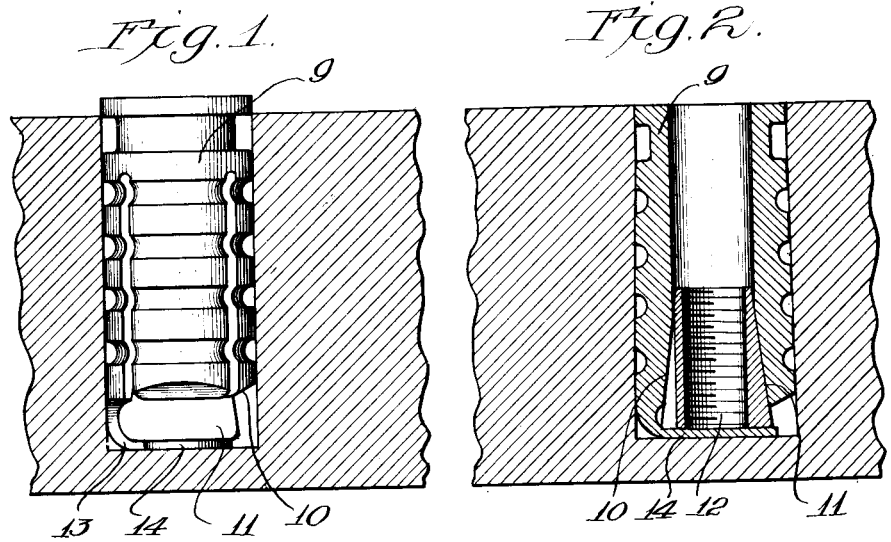
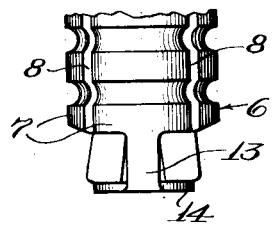
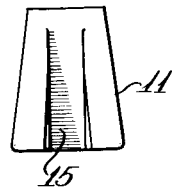
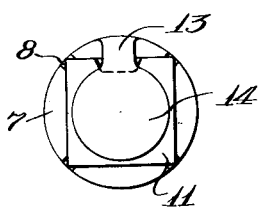
Witnesses:
Ephraim Banning
Thomas A. Banning
Inventor:
Lothar R. Zifferer
by Banning & Banning
Attys.

UNITED STATES PATENT OFFICE.

LOTHAR R. ZIFFERER, OF CHICAGO, ILLINOIS.

EXPANSION-BOLT.

1,080,615.

Specification of Letters Patent.   Patented Dec. 9, 1913.

Application filed December 26, 1912.   Serial No. 738,613.

*To all whom it may concern:*

Be it known that I, LOTHAR R. ZIFFERER, a citizen of the United States, residing at Chicago, in the county of Cook and State of Illinois, have invented certain new and useful Improvements in Expansion-Bolts, of which the following is a specification.

This invention relates to expansion bolts of the type generally used for attaching fixtures to walls, floors, or ceilings, and is particularly concerned with the means by which a quick initial expansion is produced.

It is sought in the present invention to provide a simple form of expansion bolt capable of being readily and expeditiously installed; to provide means by which the expansion bolt may be initially locked or anchored within a substance prior to the insertion of a bolt or other means for advancing an expander therein; to provide means for preventing the entrance of grit or pulverized material into the threaded interior of the expander which might otherwise interfere seriously with the engagement therewith of a threaded bolt or other suitable advancing means; and to provide means for retaining the expanding member in operative position within the inner end of the expansion bolt prior to its installation.

The invention consists further in the features of construction and combination of parts hereinafter described and claimed.

In the use of large numbers of expansion bolts it is found that considerable time is consumed in causing the shields to lock within the holes where the expansion bolts are inserted. When the bolt or lag-screw used therein is first turned, there is usually a strong tendency for the shield to rotate as well. This is due to the fact that the friction of the bolt or screw with the expander exceeds that of the exterior surface of the shield with the hole within which the device is placed. Until rotary movement of the shield ceases, the expander cannot be advanced, and as a consequence the expansion bolt cannot take hold against the sides of the hole. It is extremely desirable, therefore, that means be provided for bringing about a quick initial expansion of the expansion bolt shield within the hole, so that when the bolt or lag-screw is inserted no time or energy need be wasted because of the rotation of the shield within the hole.

The bolt hereinafter described is particularly adapted for use in concrete floors where it is intended that fixtures, such as seats, be securely fastened in place. When the holes for such seats are drilled into the concrete of the floor, a gage is usually employed in connection with the drill to predetermine the depth of each hole. The depth of the hole best suited for the expansion of my invention is substantially equal to that of the length of the shield proper. It is obvious, of course, that as a result of the drilling of the hole a considerable portion of hard concrete and gritty pulverized material will remain in the inner end of the hole, and this will tend seriously to interfere and often prevent the engagement of a bolt with the threaded interior of the expander which is located at the inner end of the shield, unless means are provided to prevent the entrance of such gritty material into the threaded interior of the expander.

In the drawing: Figure 1 is a cross section taken through a concrete floor showing in elevation the present expansion bolt inserted therein; Fig. 2 is a view similar to Fig. 1, showing the expansion bolt in longitudinal section in the position assumed after initial expansion has been produced; Fig. 3 is a view in elevation of the inner end of the expansion bolt taken in a direction at right angles to that shown in Fig. 1; Fig. 4 is a side elevation of the expanding member used in this form of expansion bolt construction; and Fig. 5 is an end elevation looking toward the expansion bolt from the inner end thereof.

There is shown in the drawing an expansion bolt, the shield 6 of which is represented as formed of a plurality of segmental sections 7 divided from each other as by means of slots 8 and united at the outer end of the device as by means of an unbroken collar 9. The interior of the expansion shield is suitably tapered at its inner end 10 to receive a tapered expander 11, here shown as a square nut, and by means of threads 12 formed upon a bore extending longitudinally through said expander a bolt (not shown) may engage therewith to advance the same into a position where the sections at the inner end of the shield will be thrust laterally against the sides of the hole within which the device is intended to be anchored. Formed at the inner end of one of the sections 7 is a web 13 which, in turn, is integrally joined with a flattened lip 14 of a size and shape to underlie the inner end of the threaded bore in the expander 11, the web 13 normally being rounded to lie partly and obliquely within a channel 15 formed in one side of the expander 11.

In Fig. 1 the expansion bolt is represented as inserted within a hole of suitable depth and diameter, the lip 14 resting against the inner end thereof, so that a portion of the outer end of the shield projects beyond the hole. When so inserted, it is intended that a hammer or other blunt instrument may be used to drive the expansion bolt farther within the hole until it assumes a position substantially as is shown in Fig. 2. It is obvious that, upon being so driven within the hole, the lip 14 which rests against the inner end of the hole and against the expander 11 will be bent upwardly, together with the web 13, to drive the expander a sufficient distance within the shield so as to cause the device to be quickly anchored within the hole. The advancement of the expander within the shield results from an upward bending of the lip and web, and it is apparent that thereafter a rebound or retraction of the expander from out the shield cannot take place. In actual practice, an expansion bolt of the type described may, with ease, be quickly and initially expanded by a single blow of a hammer, so that, when a bolt or lag-screw is inserted immediately thereafter, the shield is found to be so firmly locked within the hole as not to turn with rotation of the bolt.

By reference to Fig. 5, it will be observed that the lip 14 is so arranged as to completely cover the end of the bore within the expander. Until a bolt is threaded into the device, the threaded interior of the expander is thoroughly protected from grit and pulverized matter which might otherwise prevent the threading of the bolt therewithin. It is to be noted further that the web connecting the lip with the inner end of one of the shield sections is normally rounded and disposed obliquely, so that the lip and web tends readily to follow the movement of the expander when a blow is struck upon the expansion bolt from the outer end thereof. The channel formed in one side of the expander permits of this web lying therewithin in such a manner as to facilitate its bending in the manner described.

It is obvious that the present invention may be employed with various types and designs of expansion bolts, and that it is almost immaterial what particular form of expansion member is utilized.

I claim:

1. In an expansion bolt, a shield comprising a plurality of expansible segments having the interior faces thereof tapered from the inner toward the outer end thereof, a tapered expanding member located partly within the inner end of said shield adapted to be advanced toward the outer end thereof, a threaded bore extending longitudinally through said expanding member, and a lip formed at the inner end of one of said shield segments arranged to engage with the exposed end of said expanding member to retain the same within the shield, said lip being also arranged to overlie the open end of the threaded bore in said expanding member to prevent the entrance of material thereinto, substantially as described.

2. In an expansion bolt, a shield comprising a plurality of expansible segments, an expanding member located partly within the inner end of said shield adapted to be advanced toward the outer end thereof, said expanding member having its exterior surface channeled near the inner end thereof, a web provided at the inner end of one of said segments, adapted to lie obliquely within said channel, and a lip formed at the extremity of said web arranged both to retain the expanding member within the shield prior to expansion thereof, and to prevent receding of said expanding member when the said member has been advanced by forcing the shield thereover, substantially as described.

3. In an expansion bolt, a shield comprising a plurality of expansible segments, an expanding member located partly within the inner end of said shield adapted to be advanced toward the outer end thereof, and means for retaining said expanding means within the shield, consisting of a web formed at the inner end of one of said shield segments, and a lip provided at the extremity thereof arranged to overlie the exposed end of said expanding member, said web being obliquely and inwardly inclined with respect to the shield segment with which it is formed, whereby it tends to bend inwardly and transversely when the expanding member has been advanced by forcing the shield thereover, substantially as described.

4. In an expansion bolt, a shield comprising a plurality of expansion segments, means for expanding said segments arranged prior to expansion to lie partly outside of the inner end of the said shield and to be advanced thereinto to produce a quick expansion, and a transversely disposed lip projecting from the inner end of said shield arranged to overlie the exposed end of said expanding means to retain the same within the shield, said lip serving also to prevent receding of said expanding means when the same have been advanced by forcing the shield thereover, substantially as described.

L. R. ZIFFERER.

Witnesses:
EPHRAIM BANNING,
JOSEPH B. MORAN.